United States Patent [19]
Petrides et al.

[11] Patent Number: 6,060,698
[45] Date of Patent: May 9, 2000

[54] METHOD OF CONTROLLING THE OPERATION OF A COOKING APPLIANCE

[75] Inventors: Christie Petrides, Monroe, Conn.; Duc Hoang Tran, Boca Raton, Fla.

[73] Assignee: HP Intellectual Corp., Wilmington, Del.

[21] Appl. No.: 09/243,065

[22] Filed: Feb. 2, 1999

Related U.S. Application Data

[63] Continuation of application No. 08/926,077, Sep. 2, 1997, Pat. No. 5,948,305.

[51] Int. Cl.[7] .................................................. H05B 1/02
[52] U.S. Cl. ........................ 219/492; 219/518; 219/497; 219/501; 99/329 R
[58] Field of Search .................................... 219/519, 518, 219/492, 497, 501, 505; 99/329 P, 325–333, 389, 329 R

[56] References Cited

U.S. PATENT DOCUMENTS

| | | |
|---|---|---|
| 4,345,145 | 8/1982 | Norwood ................................ 219/492 |
| 4,518,849 | 5/1985 | Rolland . |
| 5,044,263 | 9/1991 | Birkert et al. . |
| 5,128,521 | 7/1992 | Lanno et al. ............................ 219/518 |
| 5,283,421 | 2/1994 | Richards . |
| 5,402,708 | 4/1995 | Krasznai et al. ........................ 219/497 |
| 5,414,243 | 5/1995 | Snell et al. . |
| 5,698,123 | 12/1997 | Tran ........................................ 219/501 |
| 5,705,791 | 1/1998 | Sutton et al. ............................ 219/492 |

*Primary Examiner*—Mark Paschall
*Attorney, Agent, or Firm*—Barry E. Deutsch

[57] ABSTRACT

An integrated circuit constructed to provide control functions to a toaster oven cooking appliance. Said control functions including compensation for input voltage fluctuations, compensation for residual heat due to recycling, audible signal generation, multiple mode selection, safety shut off and others. The integrated circuit also provides flexibility to accommodate multiple models of an appliance in a product line.

3 Claims, 4 Drawing Sheets

METHOD OF CONTROLLING THE OPERATION OF A COOKING APPLIANCE

This application is a continuation of No. 08/926,077 filed Sep. 2, 1997, now U.S. Pat. No. 5,948,305.

BACKGROUND OF THE INVENTION

In the design of cooking appliances, such as toasters and toaster ovens, each different feature requires a component and interface in the control circuit. In order to produce a line of products in a particular category, it is necessary to have many different control circuits. This makes the production of the appliance more complex and adds to labor costs. It would be desirable to construct an integrated circuit module which is adaptable across a product line to provide the differing features including the necessary component and interface of each feature.

The basic feature of a control circuit for a toaster/oven type of appliance, is the control of the temperature in the cooking cavity. Cavity temperature is generally controlled by adjusting the timing of the power to the heating elements.

In toasters, the basic circuit of the control system used to adjust toasting time consists of a power supply, an oscillator, a counter, and a transistor switch. This is used to activate an on/off solenoid switch or relay which controls the power to the toaster heating elements. Adjustment is accomplished by varying the time constant of the oscillator. The oscillator is generally an RC network having a manually variable resistor. By raising the frequency of the oscillator, the time in which the counter will respond and trigger the transistor switch is reduced.

Adjustment of the resistance of the RC network is accomplished by a manually adjustable potentiometer which is set by the user. Other automatic means can be provided which responds to the temperature in the toasting cavity.

A control system of this type is shown in U.S. Pat. No. 5,402,708. This system utilizes a heat sensitive resistor to monitor and react to the residual heat accumulated by repetitive toasting cycles. A thermistor is used which performs its task by reduction of its resistance as the heat increases. Since this is a resistor which forms part of the RC network, a reduced period for the oscillator results. This translates into a shorter toasting cycle.

The broiler or oven operation is either timed by a mechanical timer or left on until interrupted by the user. In the either instance, there is a need for a safety shutoff after a reasonable time.

Other functions of a more general nature are: audible signals indicating predetermined events such as shut off, change of mode, timer expiration, etc.; voltage fluctuation compensation; additional timing sensitivity to retained heat from cycle to cycle; operational mode selection; and overall on and off actuation. It is the purpose of this invention to provide a universal toaster oven appliance control module that will allow, in conjunction with other components, many of the functions described above.

SUMMARY OF THE INVENTION

A custom designed integrated circuit is constructed with multiple pin connections including connections for an overall on and off operation which is responsive to a manual actuator to apply operating power to the control circuit. In addition the IC provides connections for an oven timer and for selection of the operational mode. The IC provides an oscillator for use in the toast mode which, in conjunction with a counter provides a timer for the toasting cycle. Adjustment of the toasting oscillator is accomplished through an RC network external to the IC. The input connectors of the IC include filters for reducing noise in the input voltage and a counter to provide an overall timed safety shut off after a predetermined period. The IC is also constructed with a separate oscillator for driving an audible signal triggered to sound upon predetermined events. In order to compensate for voltage fluctuation, the IC provides circuitry that serves to adjust the frequency of the toast oscillator inversely to the change in voltage. An external capacitor discharge circuit times the period of dormant operation between cycles and delays the reset of the toast counter for a period inversely proportional to the length of the down time. This allows the heaters to preheat to offset the difference in temperatures between the heater cavity and the control cavity.

DESCRIPTION OF THE DRAWING

The invention of this application is described in more detail below with reference to the Drawing in which.

DESCRIPTION OF THE PREFERRED EMBODIMENT

Figure 1:
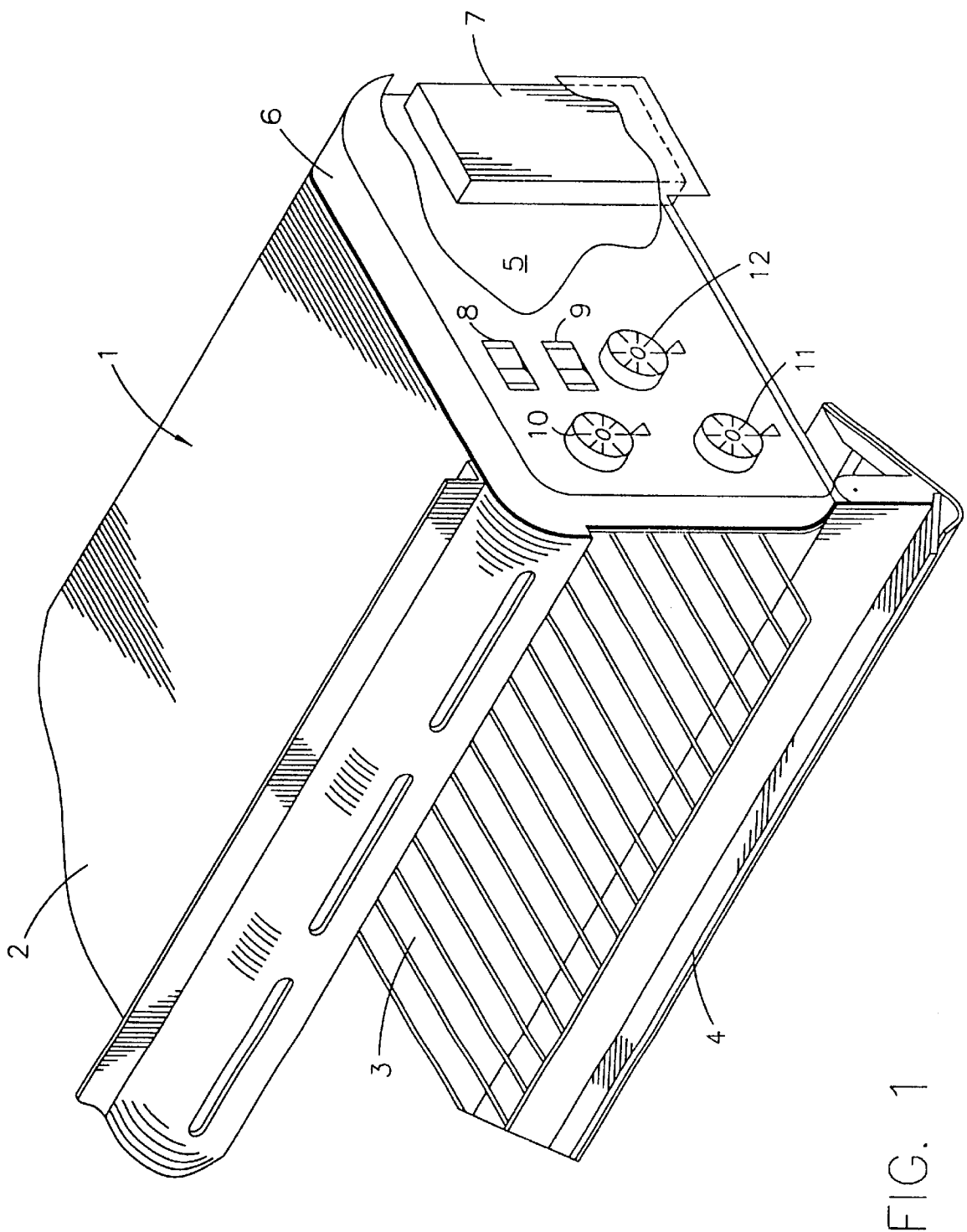
FIG. 1 is a perspective view of a toaster/oven of this invention.

A toaster oven appliance 1 is shown in FIG. 1 and is constructed with a housing 2 which encloses a cooking cavity 3. A door 4 allows the cooking cavity to be closed during use. Heating elements 22 (see FIGS. 2 and 3) are mounted within cooking cavity 3. Heating elements 22 are controlled by a system 7 for a variety of cooking functions. For this particular appliance these functions include baking, broiling, and toasting. Control system 7 is mounted in a separate cavity 5 enclosed by cover 6 and insulated from the high temperatures of the cooking cavity 3. System 7 employs a series of dials and switches such as on/off switch 8, accessory switch 9, oven timer 10, toast timer 12, and mode select switch 11 all of which allow the user to set the control system 7 for the desired function and cooking process.

Figure 2:
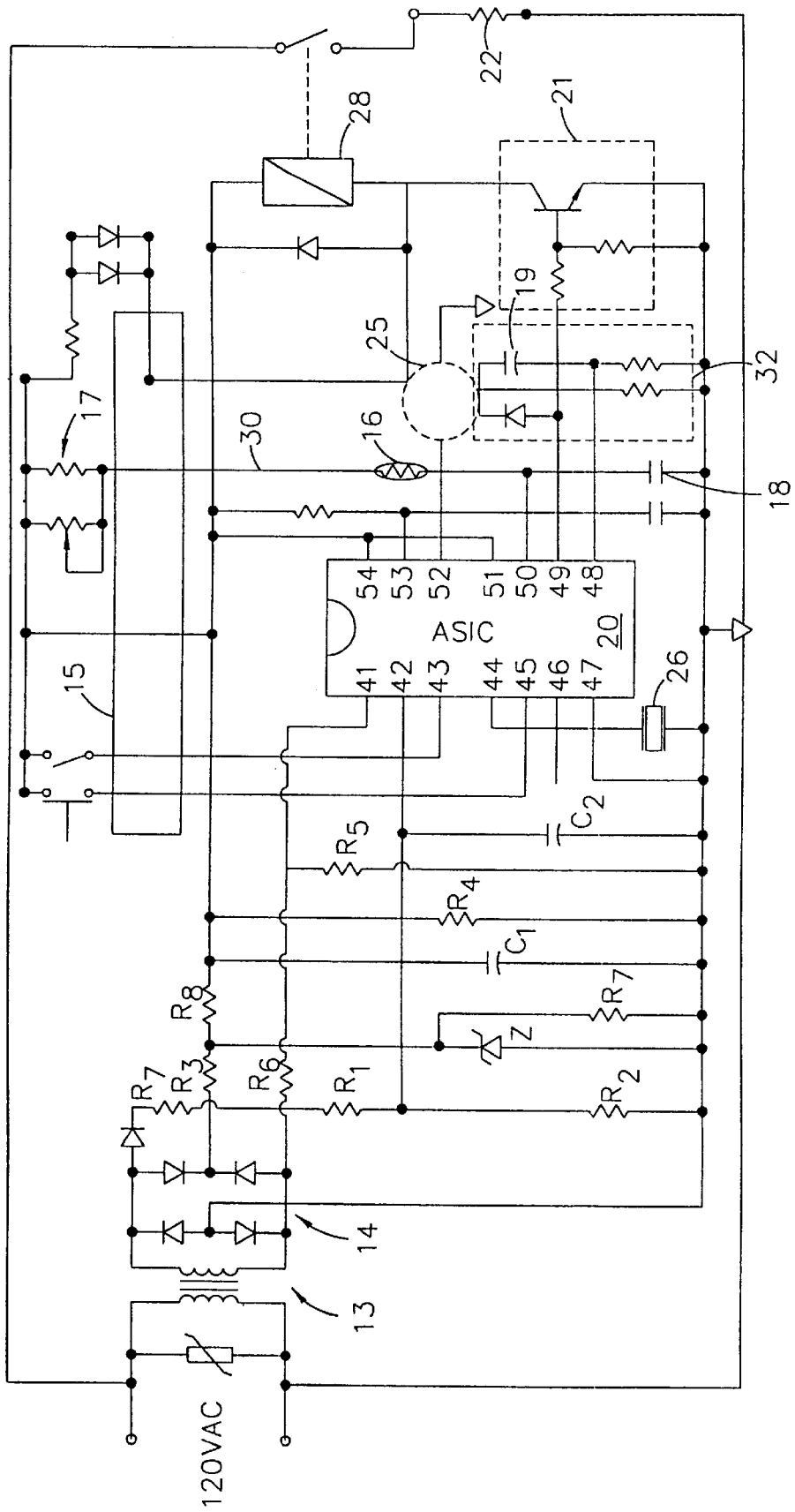
FIG. 2 is a circuit diagram of the control of the this invention.
Figure 3:
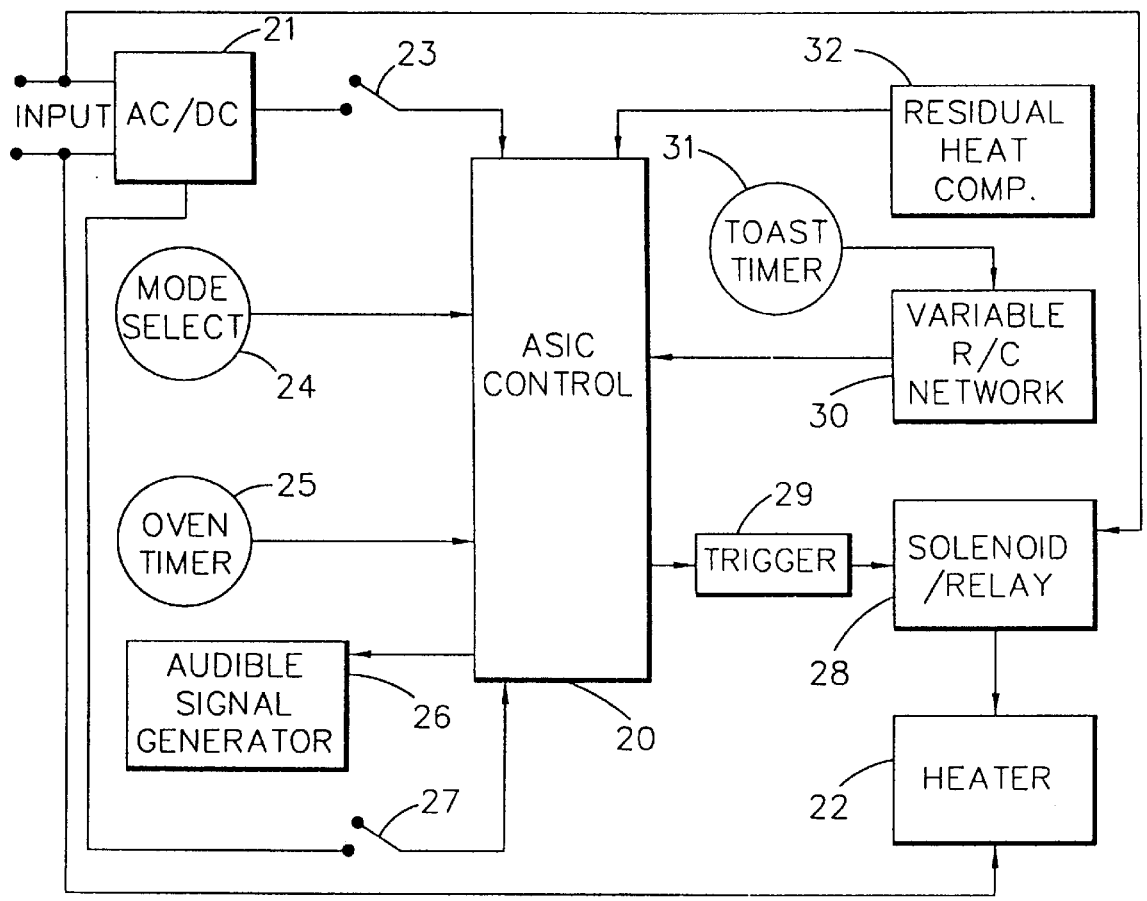
FIG. 3 is a block diagram of the control system.

The details of control system 7 are shown in FIGS. 2 and 3. The primary component of the system 7 is the custom designed integrated circuit 20 (ASIC). ASIC 20 is designed with internal circuits which make available certain functions for the-operation of the appliance in a compact and easily adaptable package. The internal circuits are connected to external components in the control system 7 through a series of pins 41 through 54. Each pin provides a function circuit or interface for the external connections or components.

ASIC 20 is supplied with power from a 120 volt, alternating current source through a step down transformer 13 and a rectifying circuit 14. The input voltage to the ASIC 20 is generally selected at 12 volts. A connection bus 15 is used to provide a convenient means to connect ASIC 20 to multiple external components.

Although pin assignment may be an infinite number of combinations, we will identify a particular pin assignment for illustration. Pin 41 contains a counter which counts the cycles of the input voltage to provide an overall clock timer for the purposes of a safety shut off of the heater. Pin 41 is therefore connected to one side of the transformer. The clock timer will act predominantly in the oven/broil mode to shut off the appliance if left cooking beyond a predetermined time limit. The counter of pin 41 includes a filter to remove possible line voltage transients.

To control the toasting cycle, an oscillator is constructed in ASIC 20 having a variable frequency in operation with the external R/C network 30 connected at pin 50. The R/C network 30 comprises a potentiometer 17, a thermistor 16, and variable capacitor 18. The potentiometer 17 is manually adjustable through dial 12. Thermistor 16 will change in resistance inversely as a function of the temperature in control cavity 5. The result of variations in thermistor 16 have the effect of compensating, to a degree, the for existence of residual heat in the cooking cavity by increasing the frequency of the toast cycle oscillator. To add further sensitivity to residual heat, capacitor 18 is selected as an NTC type temperature variable capacitor having capacitance that varies in a linear manner inversely to the heat in the control cavity 5. The use of variable capacitor 18 provides greater responsiveness to heat retention due to repetitive toasting cycles.

The output of the toast cycle oscillator is connected to a counter which counts the cycles of the oscillator and when full applies a triggering voltage at pin 49. Switching transistor 29 is connected to pin 49 and will operate in response to the toasting cycle counter to actuate the solenoid or relay 28 and disconnect the heaters 22.

The toast cycle oscillator is a voltage controlled oscillator which will vary its nominal period in response to the fluctuations in input voltage. A higher voltage will result in a quicker cycling of the oscillator. To accomplish this, line voltage is applied to pin 42 of ASIC 20.

A second oscillator is designed into ASIC 20 to provide a drive frequency for the audible signal generator 26. The frequency of the audio drive oscillator is determined by a second external R/C network connected at pin 53 of ASIC 20. A piezo-electric crystal may be used to generate the audio signal and is shown connected to the output of the audio oscillator at pin 44. The audio oscillator is triggered through internal signals indicating a variety of events including: mode change, shut off, and end of cycle.

Figure 4:
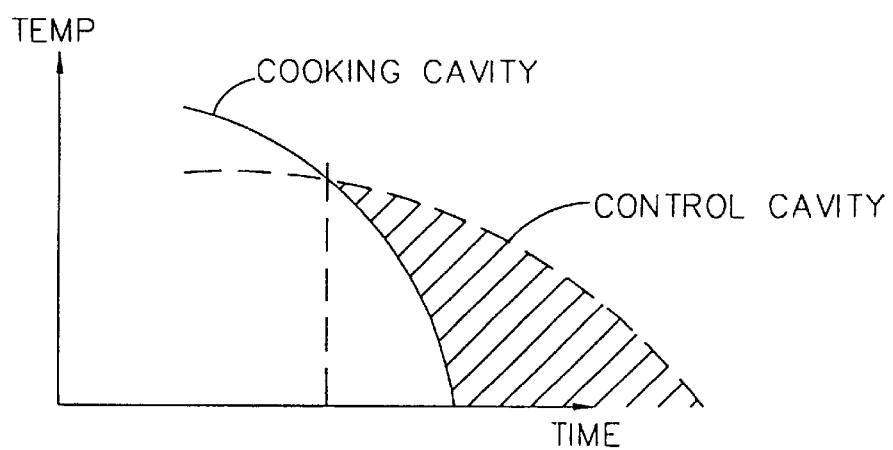
FIG. 4 is a graph of the temperature in the heater cavity and the control cavity during down time.
Figure 5:
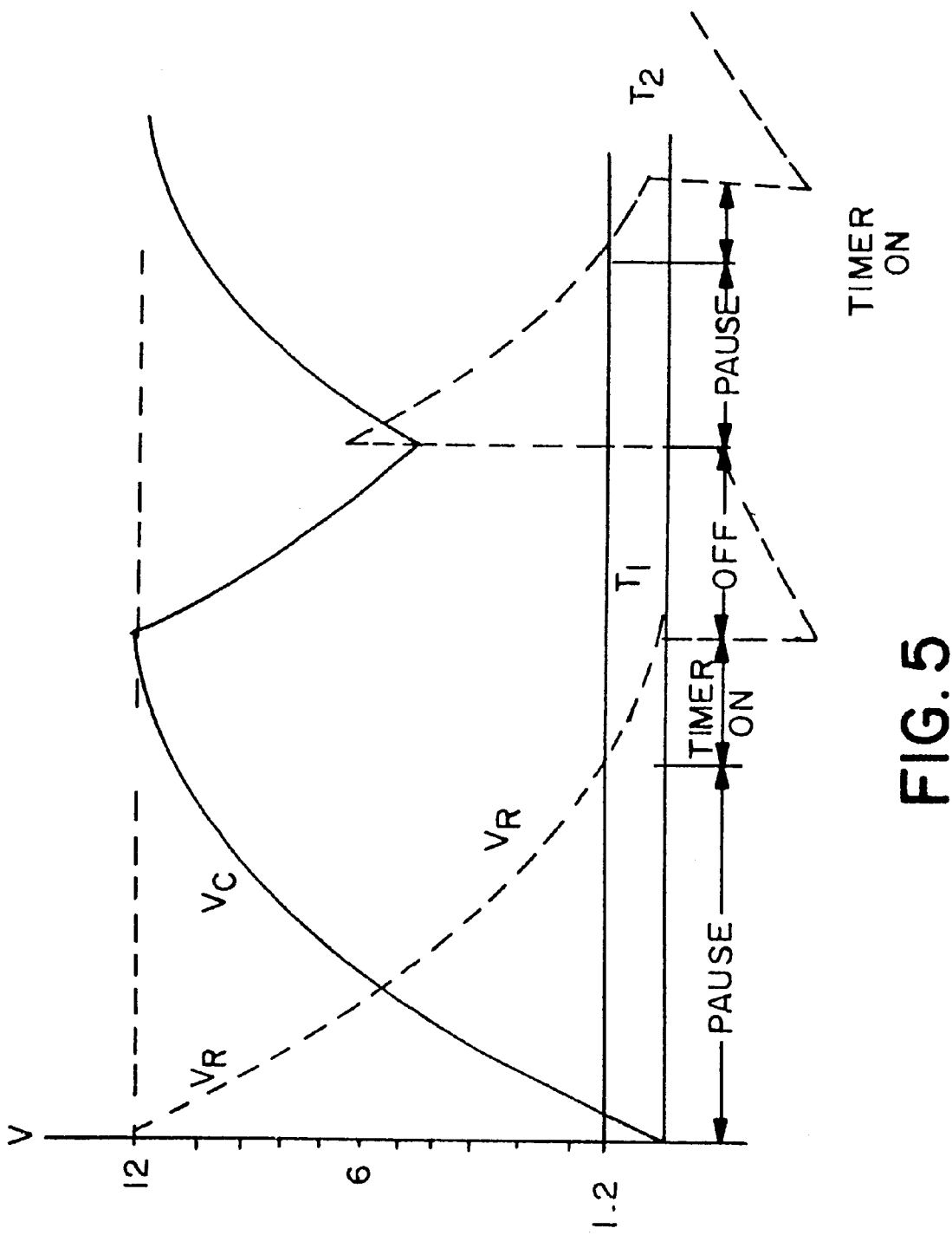
FIG. 5 is a graph of system voltage as a function of time.

The use of a temperature responsive R/C network in the toast cycle oscillator is an attempt to compensate for excessive heat in the cooking cavity 3, but in actuality the adjustment is based on the residual heat in the control cavity 5. After a certain period of dormancy it has been found that the heat in the control cavity 5 is greater than the cooking cavity 3. This will lead to compensation in the wrong direction and a variance in the desired cooking process. As shown in FIG. 4, the heat in control cavity 5 dissipates at a slower rate than cooking cavity 3. Later in the cycle, it is desirable to compensate for this differential, as the thermistor will generate a frequency that will result in a toasting cycle that is too short. To accomplish this a capacitor 19 is connected to charge during the toasting cycle. This results in a voltage being applied to pin 48 of ASIC 20 until the capacitor 19 discharges. The presence of this voltage will delay the resetting of the toast cycle counter until a preset voltage is attained, thereby extending the heating cycle to allow the cavity 3 to obtain an operating warmth.

A mode selector switch 24 is used to select the desired operation of the appliance. In the oven position the toast oscillator is disabled and timing is provided by an adjustable timer 25. An audible signal will be sounded in response to a change in mode and the expiration of the set time. Pin 45 provides the necessary connections to accomplish the mode selection and pin 52 of ASIC 20 receives the timer signal. An on off switch 23 is connected at pin 43 of ASIC 20 to energize the control system 7 and sound an audible signal. In each of the above instances appropriate resistive elements and digital filters are constructed internally for each of the pins 43, 45, and 52. The filters provide a delay which prevents nonrepetitive signals from being counted or generating other undesirable responses to false signals generated by switch chatter, arcing or other electrical noise. The resistive elements facilitate connection by pinning voltage levels at a desirable default setting to prevent false indications. In this manner the ASIC 20 facilitates connections.

A series of appliances can be designed around the control system 7 of this invention through the use of additional connections which will accommodate different size cooking cavities, solenoid or relay actuation, additional power, and more detailed cooking processes such as four slice and six slice toasting. In this manner each of the models in a product line can utilize the same integrated circuit.

We claim:

1. A method of controlling the operation of a cooking appliance having a cooking cavity used for at least toasting a comestible placed in the cavity, at least one heating element connected to an alternating current source of electrical power and a control circuit mounted in a separate control cavity comprising the steps of:

sensing the temperature of the control cavity;

providing the user of the appliance with a timer control for establishing a nominal time during which the heating element is connected to the alternating current source of power;

varying the nominal time in inverse relation to the temperature in the control cavity; and delaying activation of the timer control in direct proportion to the period of time elapsing between consecutive toasting cycles.

2. A method of controlling the operation of a cooking appliance in accordance with claim 1 wherein the cooking appliance further includes broiling and baking modes of operation and further including the step of:

sounding an audible signal when the mode of operation of the cooking appliance is changed.

3. A method of controlling the operation of a cooking appliance in accordance with claim 2 further comprising the step of:

sounding an audible signal when a cycle of operation is completed.

* * * * *